United States Patent
Cao et al.

(10) Patent No.: US 11,915,514 B2
(45) Date of Patent: Feb. 27, 2024

(54) METHOD AND APPARATUS FOR DETECTING FACIAL KEY POINTS, COMPUTER DEVICE, AND STORAGE MEDIUM

(71) Applicant: Tencent Technology (Shenzhen) Company Limited, Shenzhen (CN)

(72) Inventors: Xuan Cao, Shenzhen (CN); Weijian Cao, Shenzhen (CN); Yanhao Ge, Shenzhen (CN); Chengjie Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 341 days.

(21) Appl. No.: 17/184,368

(22) Filed: Feb. 24, 2021

(65) Prior Publication Data

US 2021/0182537 A1   Jun. 17, 2021

Related U.S. Application Data

(63) Continuation of application No. PCT/CN2019/121237, filed on Nov. 27, 2019.

(30) Foreign Application Priority Data

Dec. 10, 2018   (CN) .......................... 201811503905.5

(51) Int. Cl.
*G06T 7/00* (2017.01)
*G06V 40/16* (2022.01)
(Continued)

(52) U.S. Cl.
CPC .......... *G06V 40/165* (2022.01); *G06V 10/764* (2022.01); *G06V 10/82* (2022.01); *G06V 40/161* (2022.01); *G06V 40/171* (2022.01)

(58) Field of Classification Search
CPC .......... G06N 3/045; G06N 3/08; G06N 3/084; G06N 3/048; G06N 20/00; G06V 40/172;
(Continued)

(56) References Cited

U.S. PATENT DOCUMENTS

| 7,881,494 B2 | 2/2011 | Kitamura |
| 10,019,622 B2 | 7/2018 | Cao et al. |

(Continued)

FOREIGN PATENT DOCUMENTS

| CN | 102194131 A | 9/2011 |
| CN | 102799868 A | 11/2012 |

(Continued)

OTHER PUBLICATIONS

Tencent Technology, ISR, PCT/CN2019/121237, Mar. 3, 2020, 2 pgs.

(Continued)

*Primary Examiner* — Quan M Hua
(74) *Attorney, Agent, or Firm* — Morgan, Lewis & Bockius LLP

(57) ABSTRACT

This application relates to a method and an apparatus for detecting facial key points, a computer device, and a storage medium including: acquiring a to-be-detected face image from a current frame; determining partial images in the to-be-detected face image, each partial image including one or more facial key points; determining, within each of the partial images, candidate points of the one or more facial key points corresponding to the partial image, respectively; and jointly constraining the candidate points in the partial images to determine a set of facial key points from the candidate points for the to-be-detected face image. For the partial images in the entire to-be-detected face image, the candidate points of the facial key points corresponding to the partial images are respectively determined. Therefore, a (Continued)

calculation amount may be reduced, and the efficiency of determining the candidate points of the facial key points is improved.

16 Claims, 8 Drawing Sheets

(51) Int. Cl.
*G06V 10/764* (2022.01)
*G06V 10/82* (2022.01)

(58) Field of Classification Search
CPC .... G06V 40/161; G06V 10/764; G06V 10/82; G06V 40/165; G06V 40/168; G06V 40/171; G06V 10/44; G06V 40/166; G06V 40/174; G06V 20/52; G06V 40/23; G06F 18/2413; G06F 18/241; G06F 18/2135; G06T 13/40; G06T 17/20; G06T 19/20; G06T 2200/08; G06T 2207/10016; G06T 2207/10028; G06T 2207/20081; G06T 2207/20084; G06T 2207/30201; G06T 7/55; G06T 17/00
See application file for complete search history.

(56) References Cited

U.S. PATENT DOCUMENTS

| 2007/0195996 | A1 | 8/2007 | Kitamura | |
| 2014/0147022 | A1* | 5/2014 | Zhou | G06V 40/171 382/118 |
| 2014/0247993 | A1 | 9/2014 | Lin et al. | |
| 2017/0161551 | A1* | 6/2017 | Wang | G06F 18/00 |
| 2018/0373859 | A1* | 12/2018 | Ganong | G06F 21/64 |
| 2019/0205694 | A1* | 7/2019 | Wang | G06V 40/165 |
| 2021/0144295 | A1* | 5/2021 | Meng | H04N 23/667 |

FOREIGN PATENT DOCUMENTS

| CN | 105205462 | A | 12/2015 |
| CN | 106295567 | A | 1/2017 |
| CN | 106845377 | A | 6/2017 |
| CN | 106991388 | A | 7/2017 |
| CN | 107945219 | A | 4/2018 |
| CN | 108280388 | A | 7/2018 |
| CN | 109492531 | A | 3/2019 |
| CN | 109657583 | A | 4/2019 |
| JP | 2012014557 | A | 1/2012 |
| JP | 2015041293 | A | 3/2015 |
| WO | WO 0207096 | A1 | 1/2002 |

OTHER PUBLICATIONS

Tencent Technology, WO, PCT/CN2019/121237, Mar. 3, 2020, 4 pgs.
Tencent Technology, IPRP, PCT/CN2019/121237, Jun. 8, 2021, 5 pgs.
Tencent Technology, Korean Office Action, KR Patent Application No. 10-2021-7011194, dated Mar. 10, 2023, 15 pgs.
Extended European Search Report, EP19897431.3, dated Oct. 11, 2021, 9 pgs.
Prathap Nair et al., "3-D Face Detection, Landmark Localization, and Registration Using a Point Distribution Model", IEEE Transactions on Multimedia, IEEE Service Center, vol. 11, No. 4, Jun. 1, 2009, XP011346613, ISSN: 1520-9210, 13 pgs.
Tencent Technology, European Office Action, EP Patent Application No. 19897431.3, dated Jun. 20, 2023, 7 pgs.
Tencent Technology (Shenzhen) Company Limited, Japanese Office Action. JP 2021-516563, dated Oct. 2, 2023, 6 pgs.

* cited by examiner

METHOD AND APPARATUS FOR DETECTING FACIAL KEY POINTS, COMPUTER DEVICE, AND STORAGE MEDIUM

CROSS REFERENCE TO RELATED APPLICATIONS

This application is a continuation application of PCT Patent Application No. PCT/CN2019/121237, entitled "FACIAL LANDMARK DETECTION METHOD AND APPARATUS, COMPUTER DEVICE AND STORAGE MEDIUM" filed on Nov. 27, 2019, which claims priority to Chinese Patent Application No. 201811503905.5, filed with the State Intellectual Property Office of the People's Republic of China on Dec. 10, 2018, and entitled "METHOD AND APPARATUS FOR DETECTING FACIAL KEY POINTS, COMPUTER DEVICE, AND STORAGE MEDIUM", all of which are incorporated herein by reference in their entirety.

FIELD OF THE TECHNOLOGY

This application relates to the field of artificial intelligence, and in particular, to a method and an apparatus for detecting facial key points, a computer device, and a storage medium.

BACKGROUND OF THE DISCLOSURE

The facial key point detection technology plays a vital role in applications such as face recognition, face registration, and face beautification. Related facial key point detection methods can perform facial key point detection based on global facial features. For example, human face key point detection (landmark detection) refers to locating position coordinates of key points in a human face image. When the human face key point detection is performed, as shown in FIG. 1, an entire human face image is used as an input, and position coordinates of all human face key points are outputted at the same time through a neural network model or a mathematical model.

Because the related key point detection methods perform key point detection by using the entire face image as a detection object, the detection efficiency is low.

SUMMARY

Based on this, a method and an apparatus for detecting facial key points, a computer device, and a storage medium that can improve the detection efficiency are provided, which may resolve the foregoing problem of low efficiency of detecting facial key points.

A method for detecting facial key points is performed by a computer device, the method including:
  acquiring a to-be-detected face image from a current frame;
  determining partial images in the to-be-detected face image, each partial image including one or more facial key points;
  determining, within each of the partial images, candidate points of the one or more facial key points corresponding to the partial image, respectively; and
  jointly constraining the candidate points in the partial images to determine a set of facial key points from the candidate points for the to-be-detected face image.

An apparatus for detecting facial key points is provided, including:
  an overall image acquiring module, configured to acquire a to-be-detected face image from a current frame;
  a partial image determining module, configured to determine partial images in the to-be-detected face image, each partial image including one or more facial key points;
  a partial candidate point determining module, configured to determine, within each of the partial images, candidate points of the one or more facial key points corresponding to the partial image, respectively; and
  an overall key point determining module, configured to jointly constrain the candidate points in the partial images to determine a set of facial key points from the candidate points for the to-be-detected face image.

A computer device is provided, including a memory and a processor, the memory storing a plurality of computer programs that, when executed by the processor, cause the computer device to perform the aforementioned method for detecting facial key points.

A non-transitory computer-readable storage medium is provided, storing a plurality of computer programs that, when executed by a processor of a computer device, cause the computer device to perform the aforementioned method for detecting facial key points.

According to the foregoing method and apparatus for detecting facial key points, the computer device, and the storage medium, a to-be-detected face image is acquired, the to-be-detected face image being a face image of a to-be-detected frame; partial images respectively including key points in the to-be-detected face image are determined according to the to-be-detected face image; candidate points of the key points corresponding to the partial images are respectively determined based on the partial images; and the candidate points of the key points are jointly constrained to determine facial key points. For the partial images respectively including the key points in the entire to-be-detected face image, the candidate points of the key points corresponding to the partial images are respectively determined. Therefore, a calculation amount may be reduced and the efficiency of determining the candidate points of the key points is improved. In this case, the detection efficiency of the facial key points may be improved. When the method for detecting facial key points is applied to a makeup application, because the detection efficiency is improved, time consumption of the key point detection may be reduced, and frame freezing during running is reduced, so as to provide a smoother makeup effect.

DESCRIPTION OF EMBODIMENTS

To make objectives, technical solutions, and advantages of this application clearer and more comprehensible, this application is further elaborated in detail with reference to the accompanying drawings and embodiments. It is to be understood that the specific embodiments described herein are only used for explaining this application, and are not used for limiting this application.

Figure 1:
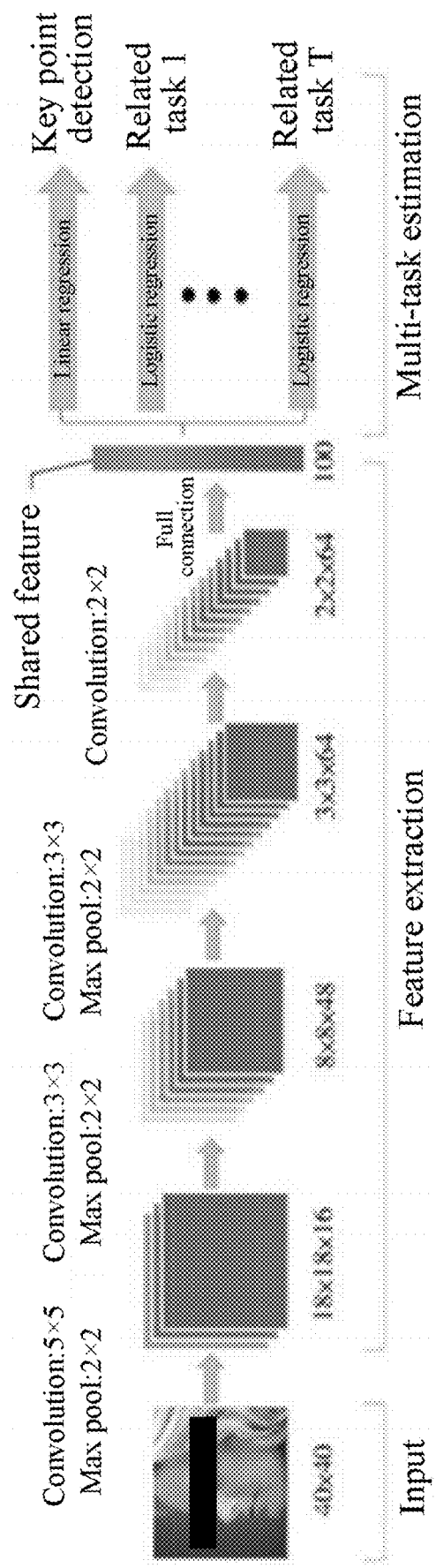
FIG. 1 is a principle diagram of a method for detecting facial key points according to the related art.
Figure 2:
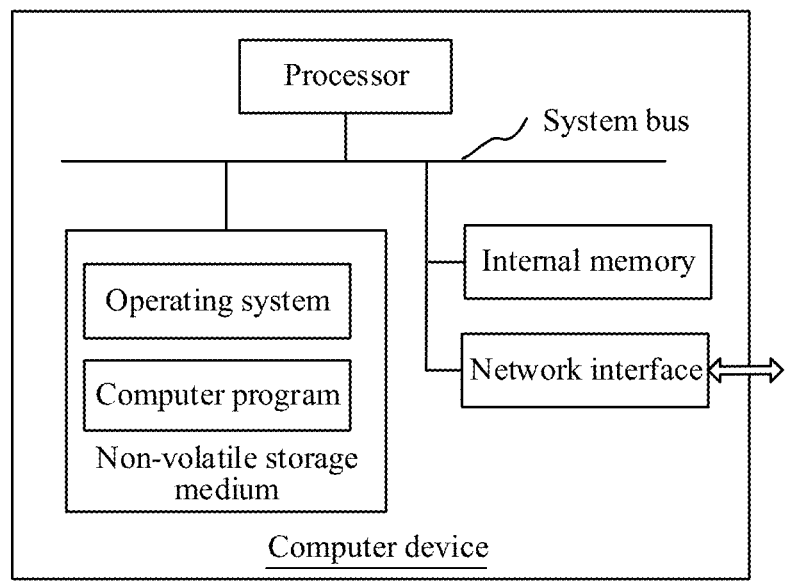
FIG. 2 is a diagram of an application environment of a method for detecting facial key points according to an embodiment.

FIG. 2 is a diagram of an application environment of a method for detecting facial key points according to an embodiment. The method for detecting facial key points is applicable to a computer device. The computer device may be a terminal or a server. The terminal may be a desktop device or a mobile terminal, such as a mobile phone, a tablet computer, or a desktop computer. The server may be an independent physical server, a physical server cluster, or a virtual server. The computer device includes a processor, a memory, and a network interface that are connected by using a system bus. The memory includes a non-volatile storage medium and an internal memory. The non-volatile storage medium of the computer device stores an operating system and a computer program, and the computer program, when executed by the processor, may cause the processor to implement operations of the method for detecting facial key points. The internal memory may also store a computer program, and the computer program, when executed by the processor, may cause the processor to perform operations of the method for detecting facial key points.

A person skilled in the art may understand that, the structure shown in FIG. 2 is only a block diagram of a part of a structure related to a solution of this application and does not limit the computer device to which the solution of this application is applied. Specifically, the computer device may include more or fewer members than those in the drawings, or include a combination of some members, or include different member layouts.

Figure 3:
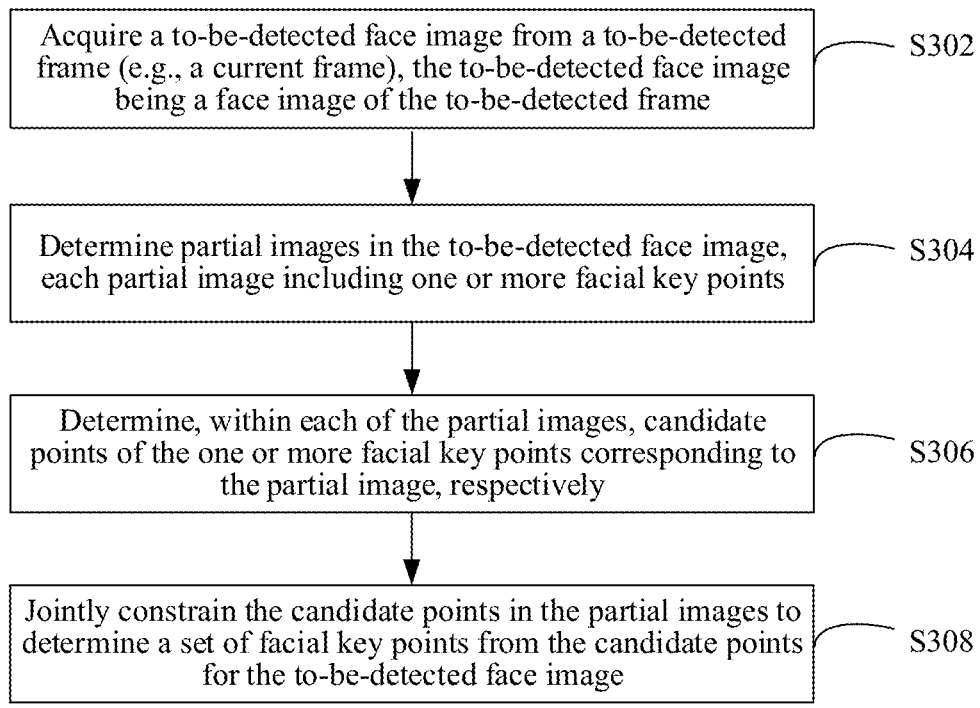
FIG. 3 is a schematic flowchart of a method for detecting facial key points according to an embodiment.

As shown in FIG. 3, in an embodiment, a method for detecting facial key points is provided. The method may be run on the computer device in FIG. 2. The method for detecting facial key points includes the following steps:

S302. Acquire a to-be-detected face image from a to-be-detected frame (e.g., a current frame), the to-be-detected face image being a face image of the to-be-detected frame.

The to-be-detected face image may be an independent face image, or may be a frame of image in a plurality of consecutive frames of face images in a dynamic scene. The to-be-detected face image may be an image including facial information. The face may be a face of a human, that is, a human face. The face may be alternatively a face of an animal, for example, a face of a cat, a dog, a lion, a tiger, or a polar bear.

It may be understood that the method may be applied to a dynamic scene, and the dynamic scene is a scene including no less than two frames of images. When facial key points are detected, detection needs to be performed on no less than two frames of face images in the scene. For example, human face key points may be detected in each frame of face images.

S304. Determine partial images in the to-be-detected face image, each partial image including one or more facial key points.

The key points may be points on facial parts in a face image, for example, points on eye corners, eyelid midpoints, a nose tip, mouth corners, and a contour. When a face type is determined, for example, when the face is a human face, key points of the face may be pre-defined. The face type may be used for indicating whether the face is a human face or an animal face. In a possible implementation, the face type may include at least one of a human face type, a cat face type, and a dog face type.

In an embodiment, each key point of the face is pre-defined, and one partial image may be acquired according to the defined key point, that is, one partial image corresponds to one key point. Pre-defining each key point of the face may include: marking a key point according to a position of the key point in the face image. For example, key points may be respectively marked as a first key point, a second key point, . . . , and an $N^{th}$ key point. N represents a total quantity of the facial key points, the first key point may be a key point at an eye corner, the second key point may be a key point at an eyelid midpoint, . . . , the 52nd key point may be a key point at a mouth corner, and so on.

In an embodiment, N may be 86. Eyes may include 22 key points, eyebrows may include 16 key points, a nose may include 11 key points, a mouth may include 18 key points, and a face contour may include 19 key points.

In an embodiment, key points may also be classified according to facial parts. For example, key points may be classified as eye key points, eyebrow key points, nose key points, mouth key points, contour key points, and other types of key points. The first key point to the 22nd key point may be the eye key points, and the 23rd key point to the 38th key point may be the eyebrow key points. A size of the partial image may be less than one tenth, one twentieth, or the like of that of the to-be-detected face image. In short, the partial image is much smaller than the to-be-detected face image.

It may be understood that, in other embodiments, a plurality of key points of the face may further be pre-defined according to a preset rule. For a plurality of key points, a partial image corresponding to the plurality of key points is acquired, that is, one partial image corresponds to a plurality of key points. In a possible implementation, pre-defining a plurality of key points of the face may include: classifying and defining facial key points according to facial parts. Types of the key points may include at least one of eye key points, eyebrow key points, nose key points, mouth key points, and contour key points. For example, a plurality of key points of the same type may be the first key point to the 22nd key point of the eye, or may be the 23rd key point to the 38th key point of the eyebrow. A size of the partial image may be less than one half, one fifth, or the like of that of the to-be-detected face image. In short, the partial image is smaller than the to-be-detected face image.

The partial image may be extracted based on the method for defining key points. For example, for each key point, a partial image corresponding to the key point is extracted from the to-be-detected face image. The partial image corresponding to the key point is a partial image including the key point. For example, for the first key point, a partial image including the first key point is extracted from the to-be-detected face image. In another example, for a plurality of key points of the same type, a partial image including the key points is extracted from the to-be-detected face image according to a preset rule. The partial image corresponding to the key points is a partial image including all the key points of this type. For example, for the eye key points, a partial image including the first key point to the 22nd key point is extracted from the to-be-detected face image.

Compared with the implementation of one partial image corresponding to a plurality of key points, the implementation of one partial image corresponding to one key point can extract a smaller partial image. Therefore, the detection efficiency can be improved. Compared with the implementation of one partial image corresponding to one key point, the implementation of one partial image corresponding to a plurality of key points can extract fewer partial images, which can reduce the calculation amount of the computer device, so that the facial key points can be determined more quickly.

S306. Determine, within each of the partial images, candidate points of the one or more facial key points corresponding to the partial image, respectively.

For each partial image, candidate points of the key points corresponding to the partial image according to a texture feature of the partial image. That is, key point detection may be performed on each partial image independently to determine candidate points of the key points corresponding to the partial image. The candidate points refer to points that may be the key points corresponding to the partial image.

In some embodiments, the candidate points of the key points corresponding to the partial images may be determined by using trained neural network models. For example, each key point may be mapped by using a corresponding neural network model to obtain a candidate point of the key point. The neural network model corresponding to each key point may be a pre-trained partial image-based neural network model. In an example in which one partial image corresponds to one key point, a quantity of neural network models is equal to a quantity of pre-defined facial key points, and each key point may correspond to one partial image-based neural network model, which can simultaneously input a plurality of partial images to a plurality of neural network models for synchronous processing to accelerate the processing. An input of the partial image-based neural network model is a partial image, and an output may be a heat map of the partial image. The heat map is an image representing an energy level by using a point distribution probability. A value of a pixel in the image represents a probability that the pixel is a key point. The heat map may represent probabilities that pixel points in the partial image are used as key points. A pixel point with a probability meeting a preset condition is a candidate point. The preset condition may be that the probability is greater than a preset probability. For example, the preset probability may be any value from 0 to 1 such as 0, 0.1, or 0.5. In this way, the accuracy of detecting the facial key points may be further improved by determining the candidate points of the key points corresponding to the partial image through the neural network model.

S308. Jointly constrain the candidate points in the partial images to determine a set of facial key points from the candidate points for the to-be-detected face image.

The candidate points of the key points correspond to the partial images respectively. Therefore, when all facial key points of the to-be-detected face image are determined, jointly constraint needs to be performed on the candidate points of the key points corresponding to the partial images to determine the facial key points. A set of the key points corresponding to the partial images of the to-be-detected face image is all the facial key points of the to-be-detected face image. All the facial key points of the to-be-detected face image are obtained by acquiring the key points corresponding to the partial images, and the partial images are concurrently processed. Therefore, time consumption of the face detection process is reduced.

In a possible implementation, the jointly constraining the candidate points of the key points to determine facial key points may include: jointly constraining the candidate points in the partial images according to a condition of the joint constraint, to determine the key points in the partial images, so as to obtain all the facial key points of the to-be-detected face image. The condition of the joint constraint indicates a condition that needs to be met after the key points corresponding to the partial images are joint. For example, when a type of the face in the to-be-detected face image is a human face type, the condition of the joint constraint may be a facial feature-based condition that needs to be met after the key points corresponding to the partial images are joint. For example, the facial feature-based condition may be that the eye key points are above the mouth key points, and the nose key points are between the eye key points and the mouth key points.

In some embodiments, the jointly constraining the candidate points of the key points to determine facial key points may include: jointly constraining the candidate points of the key points to determine the facial key points by using a trained neural network model. Inputs of the neural network model may be heat maps of the partial images, and outputs may be the facial key points of the to-be-detected face image. In this way, the detection efficiency of the facial key points may be further improved by determining the facial key points through the neural network model.

When one partial image corresponds to a plurality of key points, during the joint constraint, a rotation operation needs to be performed. Therefore, the joint constraint cannot be performed by using a linear model. When one partial image corresponds to one key point, during the joint constraint, there is no need to perform a rotation operation. Therefore, the joint constraint can be performed by using a linear model. Compared with a non-linear model in which a plurality of times of solutions are required, when the candidate points of the key points are jointly constrained based on the linear model, only a single solution is required, which requires a less calculation amount and has a higher detection speed.

In this embodiment, instead of simply taking a pixel point with the highest probability of being used as a key point in each partial image as a facial key point, the joint constraint is required. For example, when a key point has interference factors such as shielding and dark light, a probability that a corresponding pixel point is used as the key point is relatively low. However, during the joint constraint, the foregoing interference factors are checked out, and the pixel point is outputted as a facial key point.

Based on the method for detecting facial key points in this embodiment, a to-be-detected face image is acquired; partial images respectively including key points in the to-be-detected face image are determined according to the to-be-detected face image; candidate points of the key points corresponding to the partial images are respectively determined based on the partial images; and the candidate points of the key points are jointly constrained to determine facial key points. For the partial images respectively including the key points in the entire to-be-detected face image, the candidate points of the key points corresponding to the partial images are respectively determined. Therefore, a calculation amount may be reduced, and the efficiency of determining the candidate points of the key points is improved. In this case, the detection efficiency of the facial key points may be improved. In addition, the partial images can better reflect local detail features. Therefore, the method for detecting facial key points based on this embodiment can further improve the accuracy of key point detection. When the method for detecting facial key points is applied to a makeup application, because the detection efficiency is improved, time consumption of the key point detection may be reduced, and frame freezing during running is reduced, so as to provide a smoother makeup effect.

For example, the dynamic scene may be a dynamic scene in applications such as a video sharing application, a video capturing application, and a video beautification application. In these dynamic scenes, makeup may be applied to a human face, such as eye shadow, lipstick, and face thinning. When the makeup is applied to the human face, all facial parts on the human face need to be accurately located, that is, human face key points need to be detected. After key points of the facial parts are detected, the makeup may be applied to a human face image by using a computer graphics (CG) rendering technology. Because the method for detecting facial key points based on this embodiment has a beneficial effect of high detection accuracy, problems of inaccurate detection of key points and disordered makeup caused by special situations such as a side-view face pose, shielding, and dark light during makeup on the human face may be avoided. Therefore, the stability of makeup is improved.

The dynamic scene has high real-time requirements, that is, facial key points of a human face image in each video frame need to be detected in real time, that is, the dynamic scene has higher requirements for detection efficiency. The method for detecting facial key points based on this embodiment can be better applicable to the dynamic scene. While ensuring the fluency of the dynamic scene, the method is applicable to an application environment where an execution terminal is a smart terminal.

In an embodiment, the jointly constraining the candidate points of the key points to determine facial key points includes: jointly constraining the candidate points in the partial images based on a linear model to determine the set of facial key points.

It may be understood that, in the method for detecting facial key points based on this embodiment, when one partial image corresponds to one key point, during the joint constraint, there is no need to perform a rotation operation. Therefore, the candidate points of the key points may be jointly constrained based on a linear model to determine the facial key points in the to-be-detected face image. In particular, in a side-view face pose, a conventional non-linear model often has solution deviations, but more accurate facial key points may be acquired through the joint constraint based on the linear model. Compared with a non-linear model in which a plurality of times of solutions are required, when the candidate points of the key points are jointly constrained based on the linear model, only a single solution is required, which requires a less calculation amount, and can ensure a convergence to a global optimal solution.

Compared with the non-linear model, the linear model can ensure a convergence to a global optimal solution and a less calculation amount. Therefore, the method for detecting facial key points based on this embodiment can further improve the efficiency of determining the facial key points and also improve the accuracy of detecting the facial key points. When the method for detecting facial key points is applied to a makeup application, because the detection efficiency and accuracy are improved, time consumption of the key point detection may be further reduced, and frame freezing during running is reduced, so as to provide a smoother makeup effect. In this case, because it can be ensured that a global optimal solution is obtained by using the linear model, the solution deviations in the side-view face pose can be avoided, and the accuracy of the makeup in the side-view face pose is improved.

Moreover, the linear model is a dynamic linear point distribution model. The dynamic linear point distribution model is a dynamic point distribution model based on a linear constraint condition. In a possible implementation, the jointly constraining the candidate points of the key points to determine facial key points includes: acquiring constraint parameters of the partial images based on the dynamic linear point distribution model; and jointly constraining the candidate points of the key points of the partial images according to the constraint parameters, to obtain the facial key points of the partial images.

A point distribution model (PDM) is a statistical model of key point distribution in a certain class of objects, which can reflect shape features of the class of objects. In this embodiment, the PDM is a statistical model of facial key point distribution. The dynamic linear point distribution model may dynamically update the constraint parameters (PDM parameters) in real time to make the detection result more accurate. Therefore, the method for detecting facial key points based on this embodiment can ensure a convergence to a global optimal solution, a less calculation amount, and the constraint parameters to be dynamically updated in real time. Therefore, the method for detecting facial key points based on this embodiment can further improve the efficiency of determining the facial key points and further improve the accuracy of detecting the facial key points.

In a specific embodiment, inputs of the dynamic linear point distribution model are heat maps of the partial images, and outputs are the facial key points. An optimized target function in a solving process of the joint constraint solution in the dynamic linear point distribution model may be:

$$\min_{[X,Y]} \sum_{k=0}^{N} H^k_{[x,y]} + \lambda \left[\frac{B}{\Lambda}\right]^2, \text{ s.t. } [X, Y] = M_{PDM} \cdot B$$

where $H^k_{[x,y]}$ represents a probability that a $k^{th}$ key point is located at coordinates of [x,y], λ represents a regular constraint strength and may be set as any value from 0.1 to 5.0 based on experience, and B represents a PDM parameter. $M_{PDM}$ represents a matrix formed by basis vectors of the PDM, $M_{PDM}$ is a composite construction matrix, Λ represents a vector formed by a feature value corresponding to a principle component vector obtained through principle component analysis (PCA, referring to removing redundant components in key point data in trained data to obtain a principle component vector), and s.t. represents a constraint condition.

The PCA can convert a plurality of indexes of original data into fewer comprehensive indexes through dimensionality reduction. The fewer comprehensive indexes can reflect most of information about the original data. Therefore, the fewer comprehensive indexes may be considered as principle components of the original data.

In addition, in this embodiment, the constraint condition is: $[X,Y]=s\cdot([\overline{X,Y}]+\Phi\cdot B)+T$. [x,y] represents three-dimensional spatial coordinates of each facial key point, s represents a scale factor and may be a floating point number, Φ represents a matrix formed by PCA basis vectors, B represents a PDM parameter, and T represents a translation factor. The multiplication in the foregoing formula is matrix multiplication. Because the matrix multiplication has an associative property, the foregoing constraint condition may be further rewritten as: $[X, Y] = M_{PDM} \cdot B$. $M_{PDM}$ may be a composite construction matrix, for example, the first column of $M_{PDM}$ is $\overline{[x,y]}$, the second column of $M_{PDM}$ is vector $[1, 0, 1, 0, \ldots, 1, 0]$, the third column of $M_{PDM}$ is vector $[0, 1, 0, 1, \ldots, 0, 1]$, and the fourth column to the last column of $M_{PDM}$ are the PCA basis vectors. When the parameter B is solved, $B = (M_{PDM})^{-1} \cdot [X,Y]$, where $(M_{PDM})^{-1}$ represents a pseudo-inverse matrix of $M_{PDM}$.

Compared with a conventional constraint condition, $[X,Y] = s \cdot R \cdot (\overline{[X,Y]} + \Phi \cdot B) + T$, where R represents a rotation factor and may be represented as:

$$R = \begin{bmatrix} \cos\theta\cos\psi & \sin\phi\sin\theta\cos\psi - \cos\phi\sin\psi & \cos\phi\sin\theta\cos\psi + \sin\phi\sin\psi \\ \cos\theta\sin\psi & \sin\phi\sin\theta\sin\psi + \cos\phi\cos\psi & \cos\phi\sin\theta\sin\psi - \sin\phi\cos\psi \\ -\sin\theta & \sin\phi\cos\theta & \cos\phi\cos\theta \end{bmatrix}$$

where $\phi, \theta, \psi$ respectively represent angles of rotation around the X, Y, and Z axes in a three-dimensional spatial coordinate system. Because there is a non-linear factor R in the conventional constraint condition, a complex algorithm, such as a gradient descent method, is required to solve the parameter B in the formula, which is severely time-consuming and cannot ensure a global optimal solution.

In the dynamic linear point distribution model based on this implementation, during the joint constraint, there is no need to perform a rotation operation, and there is no non-linear factor in the constraint condition. Therefore, the efficiency of detecting the facial key points is high.

It may be understood that, in other embodiments, the linear model may also just be a linear point distribution model. In this way, the efficiency of determining the facial key points may be further improved and the accuracy of detecting the facial key points may also be improved.

In an embodiment, the respectively determining candidate points of the key points corresponding to the partial images based on the partial images includes: when the current frame is not a preset frame, determining partial images in a preceding frame of the current frame; and determining the candidate points of the one or more facial key points corresponding to each of the partial images in the to-be-detected face image based on a comparison of corresponding partial images between the preceding frame and the current frame.

The preset frame may be a frame set in advance, and the preset frame may be a non-key frame or a first frame. A key frame may be a video frame including key information, or may be a video frame obtained at an interval of a preset quantity of frames or a time. The non-preset frame is a key frame or a non-first frame. The first frame may be a first frame used for detecting facial key points in a dynamic scene. The non-first frame is a frame after the first frame used for detecting facial key points in a dynamic scene. The preceding frame is any frame before the to-be-detected frame, and the preceding frame may include one frame before the to-be-detected frame, or may include a plurality of frames before the to-be-detected frame. In addition, the preceding frame may be at least one frame consecutive with the to-be-detected frame. For example, the preceding frame may be a previous frame of the to-be-detected frame.

In a possible implementation, the respectively determining candidate points of the key points corresponding to the partial images based on the partial images includes: acquiring, when a preset frame is a first frame, and the to-be-detected frame is a non-preset frame, that is, the to-be-detected frame is a non-first frame, partial images respectively including key points in a preceding frame of the to-be-detected frame; and respectively determining the candidate points of the key points corresponding to the partial images in the to-be-detected face image based on the corresponding partial images in the preceding frame and the to-be-detected frame. Corresponding partial images in the preceding frame and the to-be-detected frame are a partial image in the preceding frame and a partial image in the to-be-detected frame that correspond to the same key point.

In a possible implementation, the respectively determining candidate points of the key points corresponding to the partial images based on the partial images includes: acquiring, when a preset frame is a non-key frame, and the to-be-detected frame is a non-preset frame and a non-first frame, partial images respectively including key points in a preceding frame of the to-be-detected frame; and respectively determining the candidate points of the key points corresponding to the partial images in the to-be-detected face image based on the corresponding partial images in the preceding frame and the to-be-detected frame.

The to-be-detected frame being a non-preset frame and a non-first frame refers to that the to-be-detected frame is a key frame and the key frame is not a first frame in the dynamic scene. The corresponding partial images in the preceding frame and the to-be-detected frame are respectively the partial images in the preceding frame and the partial images in the to-be-detected frame that correspond to the same key point.

In this embodiment, when the to-be-detected frame is the non-preset frame, the candidate points of the key points corresponding to the to-be-detected face image are determined, that is, the candidate points of the key points corresponding to the partial images of the to-be-detected frame are determined, by using the corresponding partial images in the to-be-detected frame and the preceding frame of the to-be-detected frame. The corresponding partial images in the preceding frame and the to-be-detected frame are respectively the partial images of the preceding frame and the partial images in the to-be-detected frame that correspond to the same key point. It may be understood that a quantity of the partial images in the to-be-detected frame is greater than 1. A quantity of the partial images in the to-be-detected frame may be the same as a quantity of the facial key points in the to-be-detected frame.

A manner of determining the partial images of the preceding frame may be predicting key point positions in a pre-detection manner and performing partial image extraction according to the predicted key point positions to obtain the partial images of the preceding frame, or may be performing partial image extraction based on a detection result of facial key points of the preceding frame to obtain the partial images of the preceding frame. The detection result of the facial key points of the preceding frame is a detection result obtained by detecting the preceding frame using the method for detecting facial key points provided in the embodiments of this application.

In the method for detecting facial key points based on this embodiment, when the to-be-detected frame is the non-preset frame, the candidate points of the key points corresponding to the partial images of the to-be-detected frame are determined by using the to-be-detected frame and the preceding frame of the to-be-detected frame. In this case, the key points in the preceding frame and the to-be-detected frame may be ensured to be consistent. Therefore, the stability of the key points in the dynamic scene may be improved. When the method for detecting facial key points is applied to a makeup application, the stability of human face key point detection on a video with consecutive frames can be improved, and the problem of makeup jittering is improved.

In an embodiment, after the jointly constraining the candidate points of the key points to determine facial key points, the method further includes: performing partial image extraction based on the facial key points, to determine partial images respectively including key points in a preceding frame of a next frame of face image.

Partial image extraction is performed based on the facial key points of the to-be-detected frame, so as to determine partial images respectively including key points in a preceding frame (that is, the current to-be-detected frame) of a next frame of face image of the to-be-detected frame may be determined. That is, after the facial key points of the current to-be-detected frame are obtained by the method for detecting facial key points provided in the embodiments of this application, partial image extraction is performed according to the obtained facial key points, to obtain the partial images including the key points, and then a next to-be-detected frame may be processed. Therefore, the obtained partial images including the key points may be used as partial images of a preceding frame of the next to-be-detected frame. For example, if the current to-be-detected frame is an $N^{th}$ frame and N is a natural number, partial images are extracted according to facial key points of the $N^{th}$ frame to obtain partial images including key points in a previous frame of an $(N+1)^{th}$ frame of face image. Partial images respectively including key points in first m frames may be obtained in the same manner. m is a natural number less than N.

In this way, a manner, that is more accurate than the pre-detection manner, of determining the partial images respectively including the key points in the preceding frame is provided, so that the accuracy of the key point detection may be further improved.

In an embodiment, the respectively determining candidate points of the key points corresponding to the partial images based on the partial images includes: respectively determining the candidate points of the key points corresponding to the partial images in the to-be-detected face image based on the partial images of the to-be-detected frame when the to-be-detected frame is a preset frame.

That is, the candidate points of the key points corresponding to the partial images in the to-be-detected face image may be respectively determined based on the partial images of the to-be-detected frame when the to-be-detected frame is a preset frame. The preset frame may be a non-key frame or a first frame. In this way, when the to-be-detected frame is the preset frame, for example, the to-be-detected frame is the first frame, and there is no preceding frame, the candidate points of the key points corresponding to the partial images in the to-be-detected face image may be respectively determined based on the partial images of the to-be-detected frame.

In an embodiment, the respectively determining candidate points of the key points corresponding to the partial images based on the partial images includes: respectively determining the candidate points of the key points corresponding to the partial images in the to-be-detected face image based on the partial images of the to-be-detected frame when the preset frame is a first frame, and the to-be-detected frame is a non-preset frame. Because the to-be-detected frame is the first frame, the to-be-detected frame does not have a preceding frame. The computer device may respectively determine the candidate points of the key points corresponding to the partial images in the to-be-detected face image based on the partial images of the to-be-detected frame.

In an embodiment, the respectively determining candidate points of the key points corresponding to the partial images based on the partial images includes: respectively determining the candidate points of the key points corresponding to the partial images in the to-be-detected face image based on the partial images of the to-be-detected frame when the preset frame is a non-key frame, and the to-be-detected frame is the preset frame. The non-key frame may be a video frame not including key information. Therefore, a manner for processing the non-key frame may be simplified, and the candidate points of the key points corresponding to the partial images may be acquired based only on the partial images of the non-key frame, which reduces the calculation amount of the computer device.

Figures 4, 5:
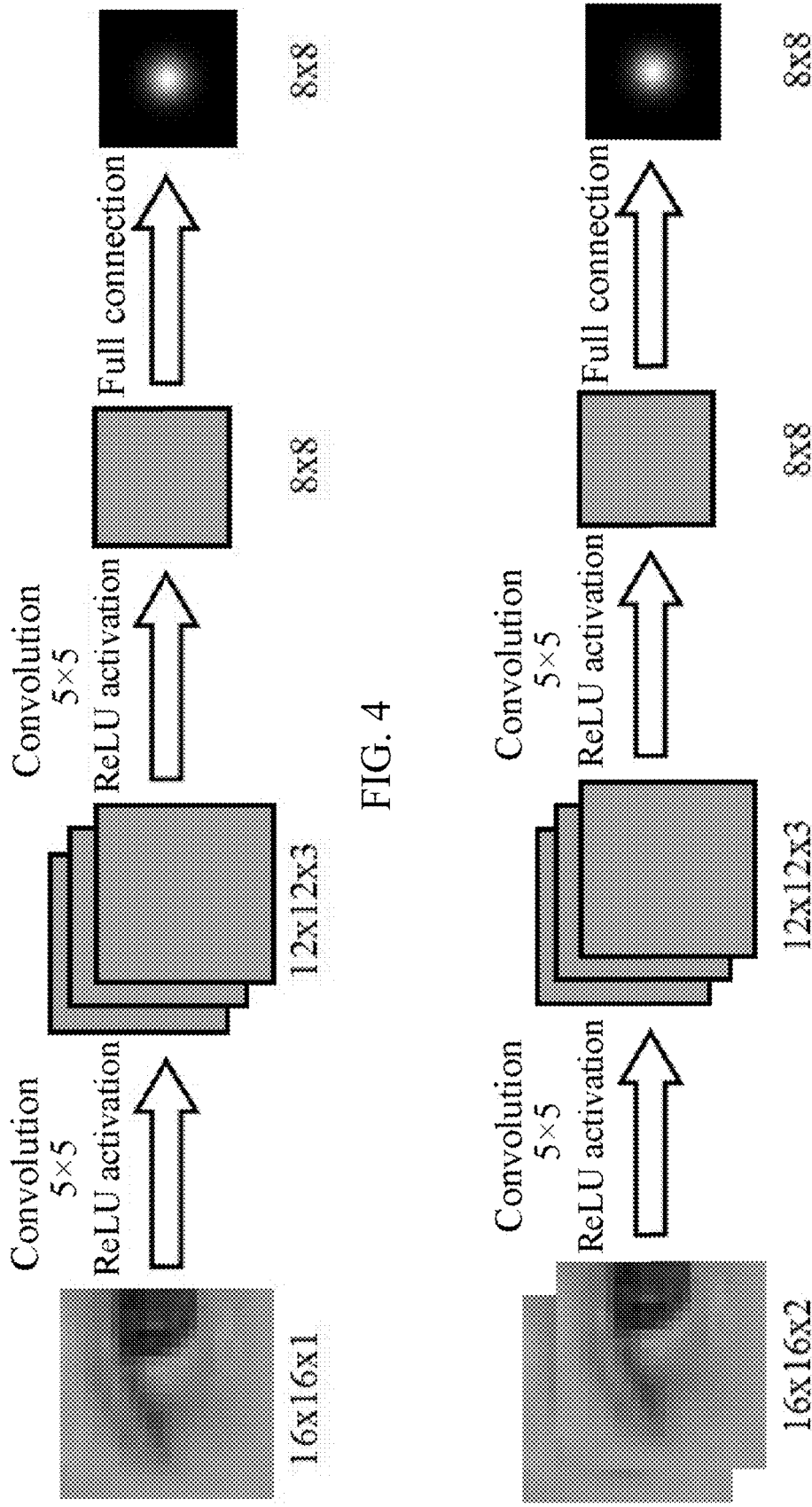
FIG. 4 is a schematic structural diagram of a neural network of a method for detecting facial key points according to a specific embodiment.
FIG. 5 is a schematic structural diagram of another neural network of a method for detecting facial key points according to a specific embodiment.

In a specific embodiment, as shown in FIG. 4 and FIG. 5, the candidate points of the key points corresponding to the partial images are determined by using trained neural network models, and probabilities that pixel points in the partial images are used as key points are represented in a heat map form, so as to determine the candidate points of the key points. For example, an input of each neural network model is a 16*16 partial image, and an output is an 8*8 heat map. Two convolution layers and one full connection layer are included between the input and the output. The sizes of convolution kernels of the convolution layers are all 5*5. Neither filling nor pooling is performed in the convolution layers, and all the convolution layers use a rectified linear unit (ReLU) as an activation function. A value of a pixel in the heat map represents a probability that the pixel is a key point, and a larger value of a pixel indicates that a higher probability that the pixel is a key point. When the neural network model is trained, parameters of the neural network model are initialized using a Gaussian distribution with a variance of 0.01 and a mean of 0, in the training method, the parameters of the neural network model are resolved by using a stochastic gradient descent (SGD) algorithm, and a back propagation error is a Euclidean distance between a predicted heat map and an annotated heat map in each iteration training. The candidate points of the key points are determined using the same neural network structure. However, the neural network models are trained independently. Therefore, the parameters of the neural network models corresponding to the facial key points are different. Training data used for training may be the public 300 W data sets and the data set annotated by the YouTu Lab.

Figure 6:
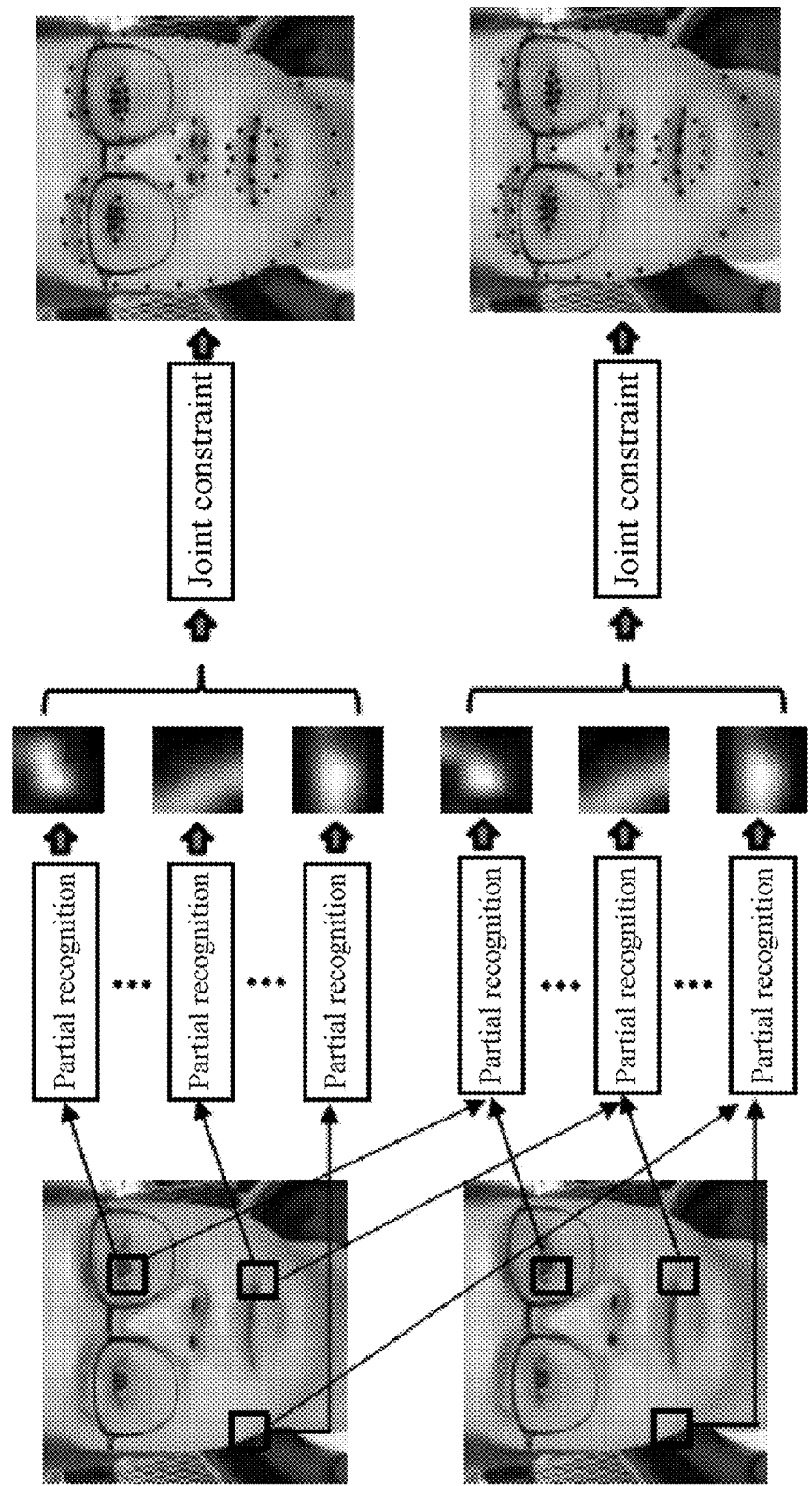
FIG. 6 is a principle diagram of a method for detecting facial key points according to a specific embodiment.

In this specific embodiment, as shown in FIG. 4 and FIG. 6, the candidate points of the key points corresponding to the partial images in the to-be-detected face image are respectively determined based on the partial images of the to-be-detected frame when the to-be-detected frame is a preset frame. As shown in FIG. 5 and FIG. 6, partial images respectively including key points in a preceding frame of the to-be-detected frame are acquired when the to-be-detected frame is a non-preset frame; and the candidate points of the key points corresponding to the partial images in the to-be-detected face image are respectively determined based on the corresponding partial images in the preceding frame and the to-be-detected frame. In FIG. 6, the upper face image is a face image of a preset frame, and the lower face image is a face image of a non-preset frame. That is, when the to-be-detected frame is a preset frame, a candidate point of each key point in the to-be-detected face image is determined based on one partial image of the to-be-detected frame. When the to-be-detected frame is a non-preset frame, a candidate point of each key point in the to-be-detected face image is determined by using one partial image of the to-be-detected frame and one partial image of the preceding frame, that is, two partial images in total.

In an embodiment, the to-be-detected face image is a human face image, and the facial key points are human face key points.

The human face key points (facial landmarks) are a set of points that can depict facial parts in the human face image, for example, a set of points of eye corners, eyelid midpoints, a nose tip, mouth corners, a contour, and the like.

The method for detecting facial key points based on this embodiment can improve the efficiency and accuracy of determining the human face key points.

In an embodiment, the manner of respectively determining candidate points of the key points corresponding to the partial images based on the partial images includes: determining, for each partial image, a heat map of the partial image, the heat map including probabilities that pixel points in the corresponding partial image are used as key points; and determining the candidate points of the key points corresponding to the partial image according to the heat map.

The probabilities that pixel points in the partial images are used as key points may be represented in a heat map form. The candidate point may be a pixel point with a probability that the pixel is used as a key point greater than a preset probability. The preset probability may be any value from 0 to 1 such as 0 or 0.1. That is, the candidate points of the key points corresponding to the partial image may be determined according to the heat map. If a key point has interference factors such as shielding and dark light, a heat value in the corresponding heat map is relatively low. However, during the joint constraint, the foregoing interference factors are checked out.

Because the heat map includes probability information about key point distribution, if a key point has interference factors such as shieling and dark light, a heat value in the corresponding heat map is relatively low. Therefore, the detection accuracy of the key points may be improved under special situations such as a side-view face pose, shielding, and dark light. When the method for detecting facial key points is applied to a makeup application, because the method can improve the detection accuracy of the key points under special situations such as a side-view face pose, shielding, and dark light, the accuracy of makeup under special situations such as a side-view face pose, shielding, and dark light can be improved, and the problem of makeup dislocation is improved.

In an embodiment, the acquiring a to-be-detected face image includes: acquiring an initial face image; and preprocessing the initial face image to obtain the to-be-detected face image.

The initial face image may be an unprocessed face image captured by a camera. The preprocessing may include operations of rotation and/or scaling to make key points of pupils of two eyes be on the same horizontal line and/or a horizontal distance between the key points of pupils of two eyes be a preset value. The rotation is to rotate the face image to make the key points of pupils of two eyes be on the same horizontal line. The scaling is to scale up or scale down the face image. The preprocessing may also include operations of acquiring a texture feature image of the initial face image and/or locating a face region on the initial face image. In this way, the efficiency of detecting facial key points may be further improved.

In an embodiment, the preprocessing includes: rotating the initial face image to make key points of pupils of two eyes be on a horizontal line; and/or scaling the initial face image to make a horizontal distance between the key points of pupils of two eyes be a preset value. The preset value is a predetermined horizontal distance value of the key points of pupils of two eyes. For example, the preset value may be 160 pixels. In this way, the efficiency of detecting facial key points may be further improved.

In an embodiment, the determining partial images respectively including key points in the to-be-detected face image according to the to-be-detected face image includes: performing facial key point initialization on the to-be-detected face image; and determining the partial images respectively including the key points in the to-be-detected face image based on a result of the initialization.

In this embodiment, the manner of performing facial key point initialization on the to-be-detected face image may include the following steps: When the to-be-detected face image does not have a preceding frame of face image, for example, the to-be-detected face image may be a first frame in a dynamic scene or an independent face image, a result of the initialization of the key points may be determined according to key point coordinates of an average face model, where the result of the initialization may be the key point coordinates of the average face model, and the key point coordinates of the average face model may be average position coordinates of the facial key points obtained after a large quantity of face models are analyzed. When the to-be-detected face image have a preceding frame of face image, a result of the initialization of the key points may be determined according to key point coordinates of the preceding frame of face image, where the result of the initialization may be the key point coordinates of the preceding frame of face image.

It may be understood that, in other embodiments, the facial key points on to-be-detected face image may be alternatively initialized in other manners. For example, the facial key points on the to-be-detected face image are initialized in a pre-detection manner.

The determining the partial images respectively including the key points in the to-be-detected face image based on a result of the initialization may be performing image extraction according to a preset size by using the result of the initialization as central positions of the partial images of the corresponding key points, to obtain the partial images including the key points.

In this way, an efficient implementation of determining the partial images respectively including the key points in the to-be-detected face image is provided, thereby improving the detection efficiency of the facial key points.

Figure 7:
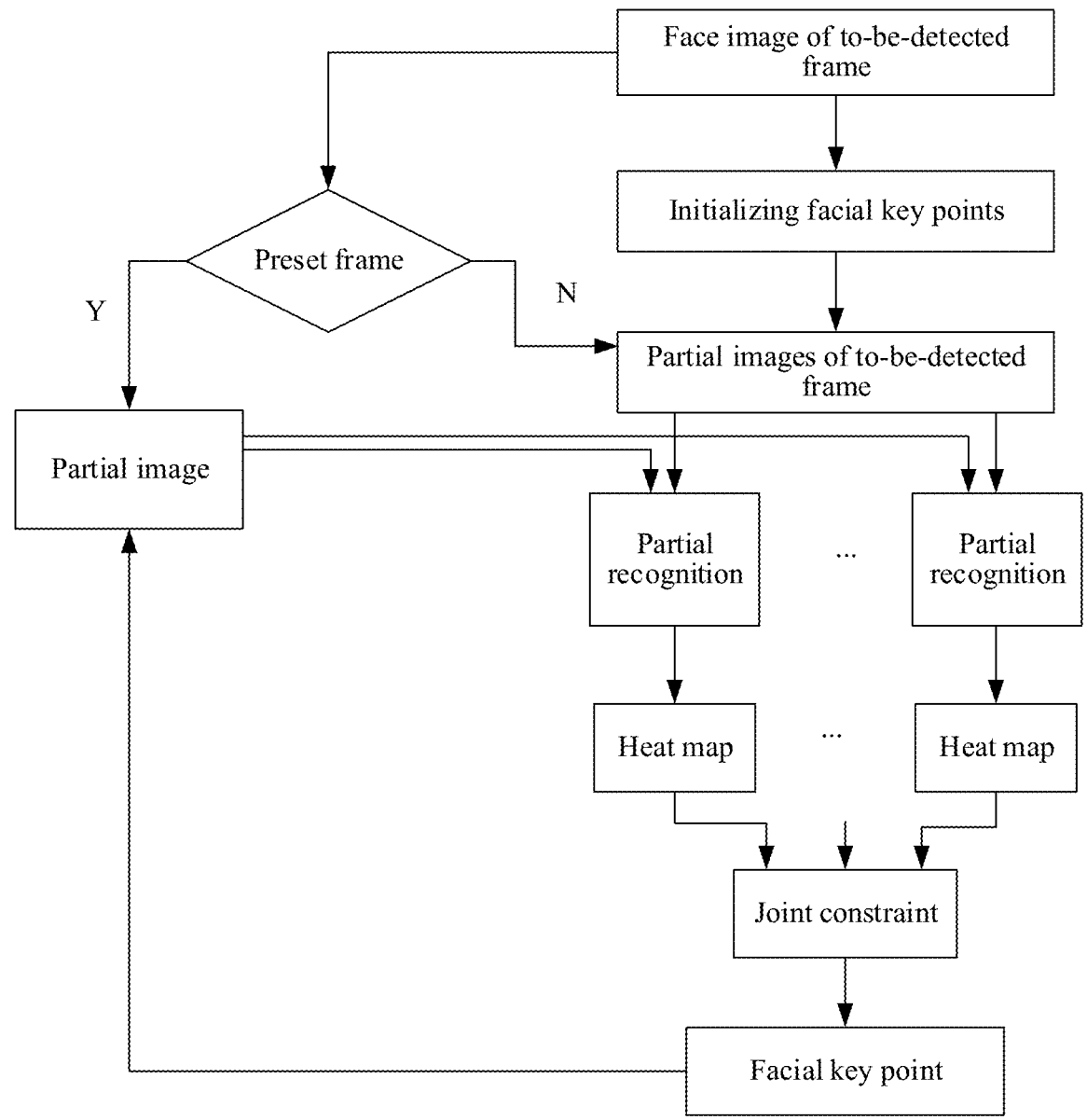
FIG. 7 is a schematic flowchart of a method for detecting facial key points according to a specific embodiment.

As shown in FIG. 7, in a specific embodiment, a method for detecting facial key points is provided. The method is applicable to a dynamic scene, and includes:

acquiring an initial face image; and rotating and scaling the initial face image to make key points of pupils of two eyes be on the same horizontal line and to make a horizontal distance between the key points of pupils of two eyes be a preset value, to obtain a to-be-detected face image the to-be-detected face image being a face image of a to-be-detected frame, and the to-be-detected face image being a human face image;

performing facial key point initialization on the to-be-detected face image; determining partial images respectively including key points in the to-be-detected face image based on a result of the initialization;

acquiring, when the to-be-detected frame is a non-preset frame, partial images respectively including key points in a preceding frame of the to-be-detected frame; and respectively determining heat maps corresponding to the partial images in the to-be-detected face image based on the corresponding partial images in the preceding frame and the to-be-detected frame;

respectively determining the heat maps corresponding to the partial images in the to-be-detected face image based on the partial images of the to-be-detected frame when the to-be-detected frame is a preset frame;

jointly constraining the heat maps based on a dynamic linear point distribution model to determine facial key points, the facial key points being human face key points; and performing partial image extraction based on the facial key points, and determining partial images respectively including key points in a preceding frame of a next frame of face image.

The method for detecting facial key points based on this embodiment can improve the efficiency, accuracy, and stability of detecting the facial key points.

Figure 8:
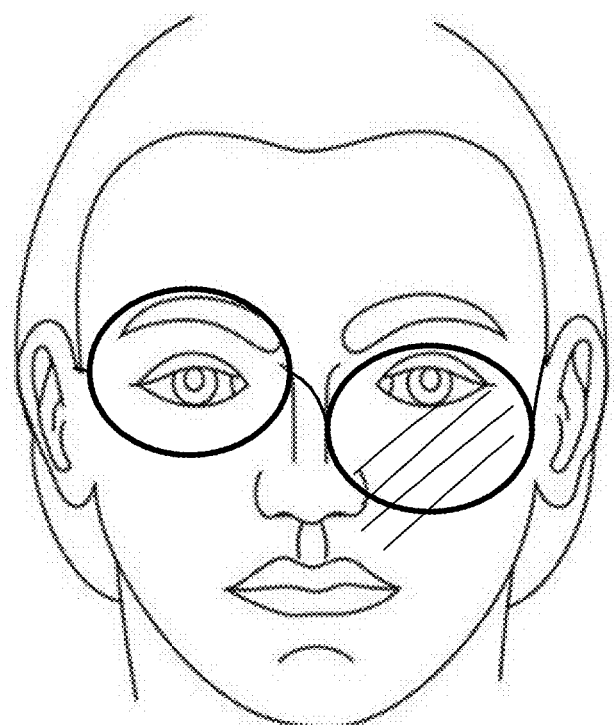
FIG. 8 is an exemplary diagram of disordered makeup obtained according to the related art.
Figure 9:
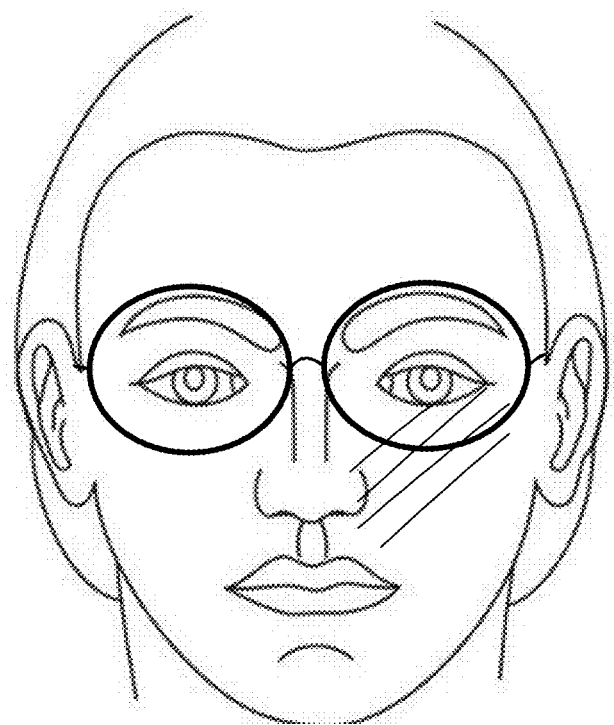
FIG. 9 is an exemplary diagram of accurate makeup obtained through a method for detecting facial key points according to an embodiment.

To describe the beneficial effects of the foregoing method for detecting facial key points more clearly, refer to FIG. 8 and FIG. 9. FIG. 8 shows that when there is dark light on one side of a human face, it is detected that key points in an eyebrow region and an eye region on the side-view face are disordered by using a method in the related art. Therefore, when a "makeup operation" of "wearing glasses" is performed on an object, the position where the glasses are worn is obviously disordered. FIG. 9 shows that when there is dark light, it is detected that the key points in the eyebrow region and the eye region on the side-view face are accurate by using the implementations of this application. Therefore, when the "makeup operation" of "wearing glasses" is performed on an object, the position where the glasses are worn is accurate.

It is to be understood that steps in flowcharts of FIG. 3 and FIG. 7 are displayed in sequence based on indication of arrows, but the steps are not necessarily performed in sequence based on a sequence indicated by the arrows. Unless otherwise clearly specified in this specification, the steps are performed without any strict sequence limit, and may be performed in other sequences. In addition, at least some steps in FIG. 3 and FIG. 7 may include a plurality of sub-steps or a plurality of stages, and these sub-steps or stages are not necessarily performed at a same moment, and may be performed at different moments. The sub-steps or stages are not necessarily performed in sequence, and the sub-steps or stages may be performed in turn or alternately with at least some of other steps, sub-steps or stages of other steps.

Figure 10:
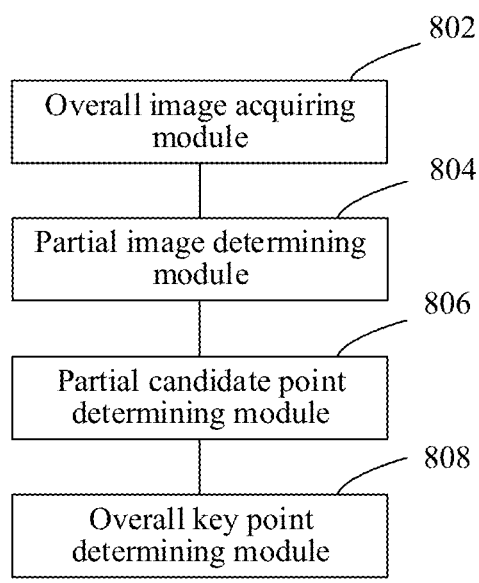
FIG. 10 is a structural block diagram of an apparatus for detecting facial key points according to an embodiment.

In an embodiment, as shown in FIG. 10, an apparatus for detecting facial key points is provided, including:

an overall image acquiring module 802, configured to acquire a to-be-detected face image, the to-be-detected face image being a face image of a to-be-detected frame;

a partial image determining module 804, configured to determine partial images respectively including key points in the to-be-detected face image according to the to-be-detected face image;

a partial candidate point determining module 806, configured to respectively determine candidate points of the key points corresponding to the partial images based on the partial images; and an overall key point determining module 808, configured to jointly constrain the candidate points of the key points to determine facial key points.

Based on the apparatus for detecting facial key points, a to-be-detected face image is acquired; partial images respectively including key points in the to-be-detected face image are determined according to the to-be-detected face image; candidate points of the key points corresponding to the partial images are respectively determined based on the partial images; and the candidate points of the key points are jointly constrained to determine facial key points. For the partial images respectively including the key points in the entire to-be-detected face image, the candidate points of the key points corresponding to the partial images are respectively determined. Therefore, a calculation amount may be reduced, and the efficiency of determining the candidate points of the key points is improved. In this case, the detection efficiency of the facial key points may be improved.

In an embodiment, the overall key point determining module is configured to jointly constrain the candidate points of the key points based on a linear model to determine the facial key points.

In an embodiment, the linear model is a dynamic linear point distribution model.

In an embodiment, the partial candidate point determining module is configured to acquire, when the to-be-detected frame is a non-preset frame, partial images respectively including key points in a preceding frame of the to-be-detected frame; and respectively determine the candidate points of the key points corresponding to the partial images in the to-be-detected face image based on the corresponding partial images in the preceding frame and the to-be-detected frame.

In an embodiment, the apparatus further includes a pre-order partial image determining module, configured to perform, after the overall key point determining module jointly constrains the candidate points of the key points to determine facial key points, partial image extraction based on the facial key points, to determine partial images respectively including key points in a preceding frame of a next frame of face image.

In an embodiment, the partial candidate point determining module is configured to respectively determine the candidate points of the key points corresponding to the partial images in the to-be-detected face image based on the partial images of the to-be-detected frame when the to-be-detected frame is a preset frame.

In an embodiment, the to-be-detected face image is a human face image, and the facial key points are human face key points.

In an embodiment, the partial candidate point determining module is configured to determine, for each partial image, a heat map of the partial image, the heat map including probabilities that pixel points in the corresponding partial image are used as key points, and determine the candidate points of the key points corresponding to the partial image according to the heat map.

In an embodiment, the overall image acquiring module is configured to acquire an initial face image, and preprocess the initial face image to obtain the to-be-detected face image.

In an embodiment, the overall image acquiring module is further configured to rotate the initial face image to make key points of pupils of two eyes be on the same horizontal line; and/or scale the initial face image to make a horizontal distance between the key points of pupils of two eyes be a preset value.

In an embodiment, the partial candidate point determining module is configured to perform facial key point initialization on the to-be-detected face image, and determine the partial images respectively including the key points in the to-be-detected face image based on a result of the initialization. In this application, the term "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

In an embodiment, a computer device is provided. The computer device may be a server. The computer device includes a processor, a memory, and a network interface that are connected by using a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The network interface of the computer device is configured to communicate with an external terminal through a network connection. The computer program is executed by the processor to implement a method for detecting facial key points.

In an embodiment, a computer device is provided. The computer device may be a terminal. The computer device includes a processor, a memory, a network interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The network interface of the computer device is configured to communicate with an external terminal through a network connection. The computer program is executed by the processor to implement a method for detecting facial key points. The display screen of the computer device may be a liquid crystal display screen or an electronic ink display screen. The input apparatus of the computer device may be a touch layer covering the display screen, or may be a key, a trackball, or a touch pad disposed on a housing of the computer device, and may further be an external keyboard, a touch pad, a mouse, or the like.

In an implementation, a computer device is provided. The computer device may be a server or a terminal. The computer device includes a memory and a processor, the memory storing a computer program, and the processor, when executing the computer program, implementing operations of the foregoing method for detecting facial key points.

In an embodiment, the computer device includes a memory and a processor, the memory storing a computer program, and the processor, when executing the computer program, implementing the following operations:

acquiring a to-be-detected face image from a current frame;

determining partial images in the to-be-detected face image, each partial image including one or more facial key points;

determining, within each of the partial images, candidate points of the one or more facial key points corresponding to the partial image, respectively; and jointly constraining the candidate points in the partial images to determine a set of facial key points from the candidate points for the to-be-detected face image.

In an embodiment, the jointly constraining the candidate points of the key points to determine facial key points includes:

jointly constraining the candidate points in the partial images based on a linear model to determine the set of facial key points for the to-be-detected face image.

In an embodiment, the linear model is a dynamic linear point distribution model.

In an embodiment, the determining, within each of the partial images, candidate points of the one or more facial key points corresponding to the partial image includes:

when the current frame is not a preset frame, determining partial images in a preceding frame of the current frame; and determining the candidate points of the one or more facial key points corresponding to each of the partial images in the to-be-detected face image based on a comparison of corresponding partial images between the preceding frame and the current frame.

In an embodiment, after the jointly constraining the candidate points of the key points to determine facial key points, the method further includes:

performing partial image extraction based on the set of facial key points, to determine partial images including the set of facial key points in a preceding frame of a next frame of the face image.

In an embodiment, the respectively determining candidate points of the key points corresponding to the partial images based on the partial images includes:

when the current frame is a preset frame, determining the candidate points in the partial images in the to-be-detected face image based on the partial images of the current frame alone.

In an embodiment, the to-be-detected face image is a human face image, and the facial key points are human face key points.

In an embodiment, the determining, within each of the partial images, candidate points of the one or more facial key points corresponding to the partial image comprises:

determining, for each partial image, a heat map of the partial image, the heat map including probabilities that pixel points in the corresponding partial image are used as key points; and determining the candidate points of the key points corresponding to the partial image according to the heat map.

In an embodiment, the acquiring a to-be-detected face image includes:
acquiring an initial face image; and
preprocessing the initial face image to obtain the to-be-detected face image.

In an embodiment, the preprocessing includes:
rotating the initial face image to make key points of pupils of two eyes be on the same horizontal line; and/or,
scaling the initial face image to make a horizontal distance between the key points of pupils of two eyes be a preset value.

In an embodiment, the determining partial images respectively including key points in the to-be-detected face image according to the to-be-detected face image includes:
performing facial key point initialization on the to-be-detected face image; and
determining the partial images respectively including the key points in the to-be-detected face image based on a result of the initialization.

In an implementation, a computer-readable storage medium is provided, storing a computer program, the computer program, when executed by a processor, implementing operations of the foregoing method for detecting facial key points.

In an embodiment, a non-transitory computer-readable storage medium is provided, storing a plurality of computer programs that, when executed by a processor, implementing the following operations:
acquiring a to-be-detected face image from a current frame;
determining partial images in the to-be-detected face image, each partial image including one or more facial key points;
determining, within each of the partial images, candidate points of the one or more facial key points corresponding to the partial image, respectively; and
jointly constraining the candidate points in the partial images to determine a set of facial key points from the candidate points for the to-be-detected face image.

In an embodiment, the jointly constraining the candidate points in the partial images to determine a set of facial key points from the candidate points for the to-be-detected face image includes:
jointly constraining the candidate points in the partial images based on a linear model to determine the set of facial key points for the to-be-detected face image.

In an embodiment, the linear model is a dynamic linear point distribution model.

In an embodiment, the determining, within each of the partial images, candidate points of the one or more facial key points corresponding to the partial image includes:
when the current frame is not a preset frame, determining partial images in a preceding frame of the current frame; and
determining the candidate points of the one or more facial key points corresponding to each of the partial images in the to-be-detected face image based on a comparison of corresponding partial images between the preceding frame and the current frame.

In an embodiment, after the jointly constraining the candidate points of the key points to determine facial key points, the method further includes:
performing partial image extraction based on the set of facial key points, to determine partial images including the set of facial key points in a preceding frame of a next frame of the face image.

In an embodiment, the respectively determining candidate points of the key points corresponding to the partial images based on the partial images includes:
when the current frame is a preset frame, determining the candidate points in the partial images in the to-be-detected face image based on the partial images of the current frame alone.

In an embodiment, the to-be-detected face image is a human face image, and the facial key points are human face key points.

In an embodiment, the manner of respectively determining candidate points of the key points corresponding to the partial images based on the partial images includes:
determining, for each partial image, a heat map of the partial image, the heat map including probabilities that pixel points in the corresponding partial image are used as key points; and
determining the candidate points of the key points corresponding to the partial image according to the heat map.

In an embodiment, the acquiring a to-be-detected face image includes:
acquiring an initial face image; and
preprocessing the initial face image to obtain the to-be-detected face image.

In an embodiment, the preprocessing includes:
rotating the initial face image to make key points of pupils of two eyes be on the same horizontal line; and/or,
scaling the initial face image to make a horizontal distance between the key points of pupils of two eyes be a preset value.

In an embodiment, the determining partial images respectively including key points in the to-be-detected face image according to the to-be-detected face image includes:
performing facial key point initialization on the to-be-detected face image; and
determining the partial images respectively including the key points in the to-be-detected face image based on a result of the initialization.

A person of ordinary skill in the art may understand that all or some of procedures of the method in the foregoing embodiments may be implemented by a computer program instructing relevant hardware. The computer program may be stored in a non-volatile computer-readable storage medium. When the computer program is executed, the procedures of the foregoing method embodiments may be implemented. References to the memory, the storage, the database, or another medium used in the embodiments provided in this application may all include a non-volatile memory and a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a Rambus direct RAM (RDRAM), a direct Rambus dynamic RAM (DRDRAM), and a Rambus dynamic RAM (RDRAM).

The technical features in the above embodiments may be randomly combined. For concise description, not all possible combinations of the technical features in the embodiment are described. However, provided that combinations of the technical features do not conflict with each other, the combinations of the technical features are considered as falling within the scope recorded in this specification.

The foregoing embodiments only describe several implementations of this application, which are described specifically and in detail, but cannot be construed as a limitation to the patent scope of the present disclosure. A person of ordinary skill in the art may make various changes and improvements without departing from the ideas of this application, which shall all fall within the protection scope of this application. Therefore, the protection scope of this application shall be subject to the protection scope of the appended claims.

What is claimed is:

1. A method for detecting facial key points, performed by a computer device, the method comprising:
    acquiring a to-be-detected face image from a current frame of a video, wherein the video includes a frame preceding the current frame and the preceding frame includes one or more partial images, each partial image having one or more facial key points;
    determining partial images in the to-be-detected face image, each partial image including one or more facial key points;
    determining, within each of the partial images, candidate points of the one or more facial key points corresponding to the partial image, respectively, further including:
        determining the candidate points of the one or more facial key points corresponding to each of the partial images in the to-be-detected face image based on a comparison of corresponding partial images between the preceding frame and the current frame; and
    jointly constraining the candidate points in the partial images of the preceding frame and the current frame to determine a set of facial key points from the candidate points for the to-be-detected face image.

2. The method according to claim 1, wherein the jointly constraining the candidate points in the partial images to determine a set of facial key points from the candidate points for the to-be-detected face image comprises:
    jointly constraining the candidate points in the partial images based on a linear model to determine the set of facial key points for the to-be-detected face image.

3. The method according to claim 1, further comprising:
    performing partial image extraction based on the set of facial key points, to determine partial images including the set of facial key points in a preceding frame of a next frame of the face image.

4. The method according to claim 1, wherein the to-be-detected face image is a human face image, and the facial key points are human face key points.

5. The method according to claim 1, wherein the determining, within each of the partial images, candidate points of the one or more facial key points corresponding to the partial image comprises:
    determining, for each partial image, a heat map of the partial image, the heat map comprising probabilities that pixel points in the corresponding partial image are used as facial key points; and
    determining the candidate points of the one or more facial key points corresponding to the partial image according to the heat map.

6. The method according to claim 1, wherein the acquiring a to-be-detected face image from a current frame comprises:
    acquiring an initial face image; and
    preprocessing the initial face image to obtain the to-be-detected face image by:
        rotating the initial face image such that facial key points of pupils of two eyes are on the same horizontal line; and/or
        scaling the initial face image such that a horizontal distance between facial key points of pupils of two eyes has a preset value.

7. The method according to claim 6, wherein the determining partial images in the to-be-detected face image, each partial image including one or more facial key points comprises:
    performing facial key point initialization on the to-be-detected face image; and
    determining the partial images respectively in the to-be-detected face image based on a result of the initialization.

8. A computer device, comprising a memory and a processor, the memory storing a plurality of computer programs that, when executed by the processor, cause the computer device to perform a plurality of operations including:
    acquiring a to-be-detected face image from a current frame of a video, wherein the video includes a frame preceding the current frame and the preceding frame includes one or more partial images, each partial image having one or more facial key points;
    determining partial images in the to-be-detected face image, each partial image including one or more facial key points;
    determining, within each of the partial images, candidate points of the one or more facial key points corresponding to the partial image, respectively, further including:
        determining the candidate points of the one or more facial key points corresponding to each of the partial images in the to-be-detected face image based on a comparison of corresponding partial images between the preceding frame and the current frame; and
    jointly constraining the candidate points in the partial images of the preceding frame and the current frame to determine a set of facial key points from the candidate points for the to-be-detected face image.

9. The computer device according to claim 8, wherein the jointly constraining the candidate points in the partial images to determine a set of facial key points from the candidate points for the to-be-detected face image comprises:
    jointly constraining the candidate points in the partial images based on a linear model to determine the set of facial key points for the to-be-detected face image.

10. The computer device according to claim 8, wherein the plurality of operations further comprise:
    performing partial image extraction based on the set of facial key points, to determine partial images including the set of facial key points in a preceding frame of a next frame of the face image.

11. The computer device according to claim 8, wherein the to-be-detected face image is a human face image, and the facial key points are human face key points.

12. The computer device according to claim 8, wherein the determining, within each of the partial images, candidate points of the one or more facial key points corresponding to the partial image comprises:
    determining, for each partial image, a heat map of the partial image, the heat map comprising probabilities that pixel points in the corresponding partial image are used as facial key points; and determining the candidate points of the one or more facial key points corresponding to the partial image according to the heat map.

13. The computer device according to claim 8, wherein the acquiring a to-be-detected face image from a current frame comprises:

acquiring an initial face image; and preprocessing the initial face image to obtain the to-be-detected face image by:

rotating the initial face image such that facial key points of pupils of two eyes are on the same horizontal line; and/or scaling the initial face image such that a horizontal distance between facial key points of pupils of two eyes has a preset value.

14. The computer device according to claim 13, wherein the determining partial images in the to-be-detected face image, each partial image including one or more facial key points comprises:

performing facial key point initialization on the to-be-detected face image; and determining the partial images respectively in the to-be-detected face image based on a result of the initialization.

15. A non-transitory computer-readable storage medium, storing a plurality of computer programs that, when executed by a processor of a computer device, cause the computer device to perform a plurality of operations including:

acquiring a to-be-detected face image from a current frame of a video, wherein the video includes a frame preceding the current frame and the preceding frame includes one or more partial images, each partial image having one or more facial key points;

determining partial images in the to-be-detected face image, each partial image including one or more facial key points;

determining, within each of the partial images, candidate points of the one or more facial key points corresponding to the partial image, respectively, further including:

determining the candidate points of the one or more facial key points corresponding to each of the partial images in the to-be-detected face image based on a comparison of corresponding partial images between the preceding frame and the current frame; and jointly constraining the candidate points in the partial images of the preceding frame and the current frame to determine a set of facial key points from the candidate points for the to-be-detected face image.

16. The non-transitory computer-readable storage medium according to claim 15, wherein the determining, within each of the partial images, candidate points of the one or more facial key points corresponding to the partial image comprises:

determining, for each partial image, a heat map of the partial image, the heat map comprising probabilities that pixel points in the corresponding partial image are used as facial key points; and determining the candidate points of the one or more facial key points corresponding to the partial image according to the heat map.

* * * * *